United States Patent [19]

Jourdain et al.

[11] Patent Number: 5,520,336
[45] Date of Patent: May 28, 1996

[54] NOZZLE FOR A JET ENGINE CONTAINING AN ADJUSTABLE CONVERGENT-DIVERGENT PORTION

[75] Inventors: Gérard E. A. Jourdain, Saintry sur Seine; Marcel R. Soligny, Chevilly Larue, both of France

[73] Assignee: Societe Nationale d'Etude et de Construction de Moteurs d'Aviation (S.N.E.C.A.), Paris Cedex, France

[21] Appl. No.: 237,399

[22] Filed: Jan. 13, 1981

[30] Foreign Application Priority Data

Jan. 14, 1980 [FR] France ................. 80 00869

[51] Int. Cl.⁶ .................................................. F02K 1/12
[52] U.S. Cl. ............................ 239/265.39; 60/271
[58] Field of Search .......... 239/265.41, 265.39, 239/265.37, 265.33, 265.19; 60/228, 232, 271

[56] References Cited

U.S. PATENT DOCUMENTS

| | | | |
|---|---|---|---|
| 2,984,068 | 5/1961 | Eatock | 239/265.39 |
| 3,420,442 | 1/1969 | Teagle | 239/265.41 |
| 3,537,647 | 11/1970 | Camboulives et al. | 239/265.39 |
| 3,837,580 | 9/1974 | Camboulives et al. | 239/265.39 |
| 3,954,225 | 5/1976 | Camboulives et al. | 239/265.41 |
| 4,049,199 | 9/1977 | Nightingale | 239/265.39 |
| 4,176,792 | 12/1979 | McCardle, Jr. | 239/265.41 |
| 4,196,856 | 4/1980 | James | 239/265.39 |
| 4,245,787 | 1/1981 | Freid | 239/265.41 |
| 4,311,276 | 1/1982 | Hall | 239/265.39 |

*Primary Examiner*—Stephen C. Bentley
*Attorney, Agent, or Firm*—Bacon & Thomas

[57] ABSTRACT

A nozzle comprises: a set of first flaps articulated to a rigid structure, and forming a convergent; a set of second flaps each articulated to a corresponding first flap, and forming a divergent; a set of third flaps each of which is connected at a position between two adjacent second flaps and which is, on the one hand, articulated to the rigid structure and, on the other hand, linked to each of the two adjacent second flaps by carrier linked to the aforesaid third flap by a ball joint.

9 Claims, 3 Drawing Sheets

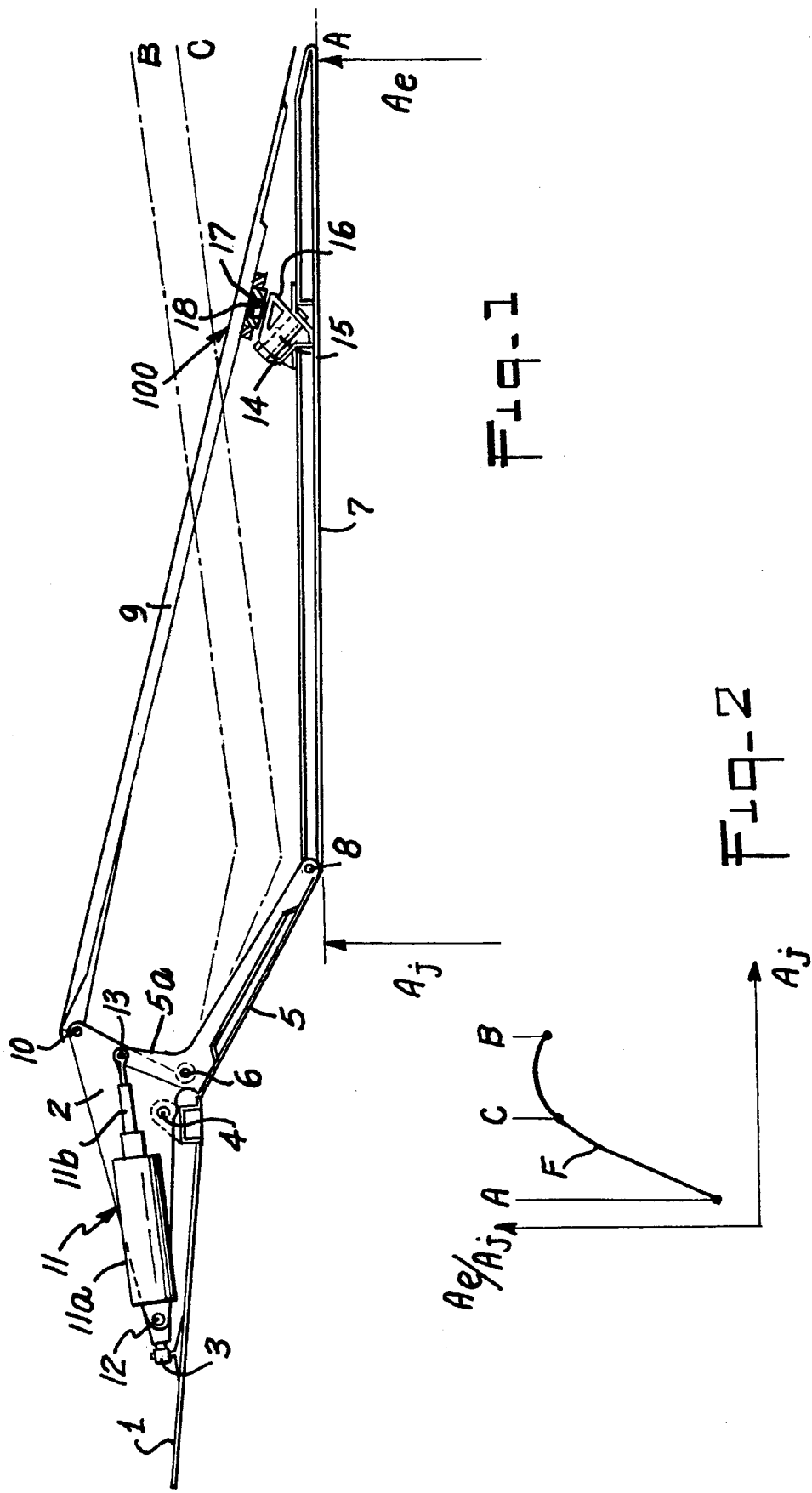

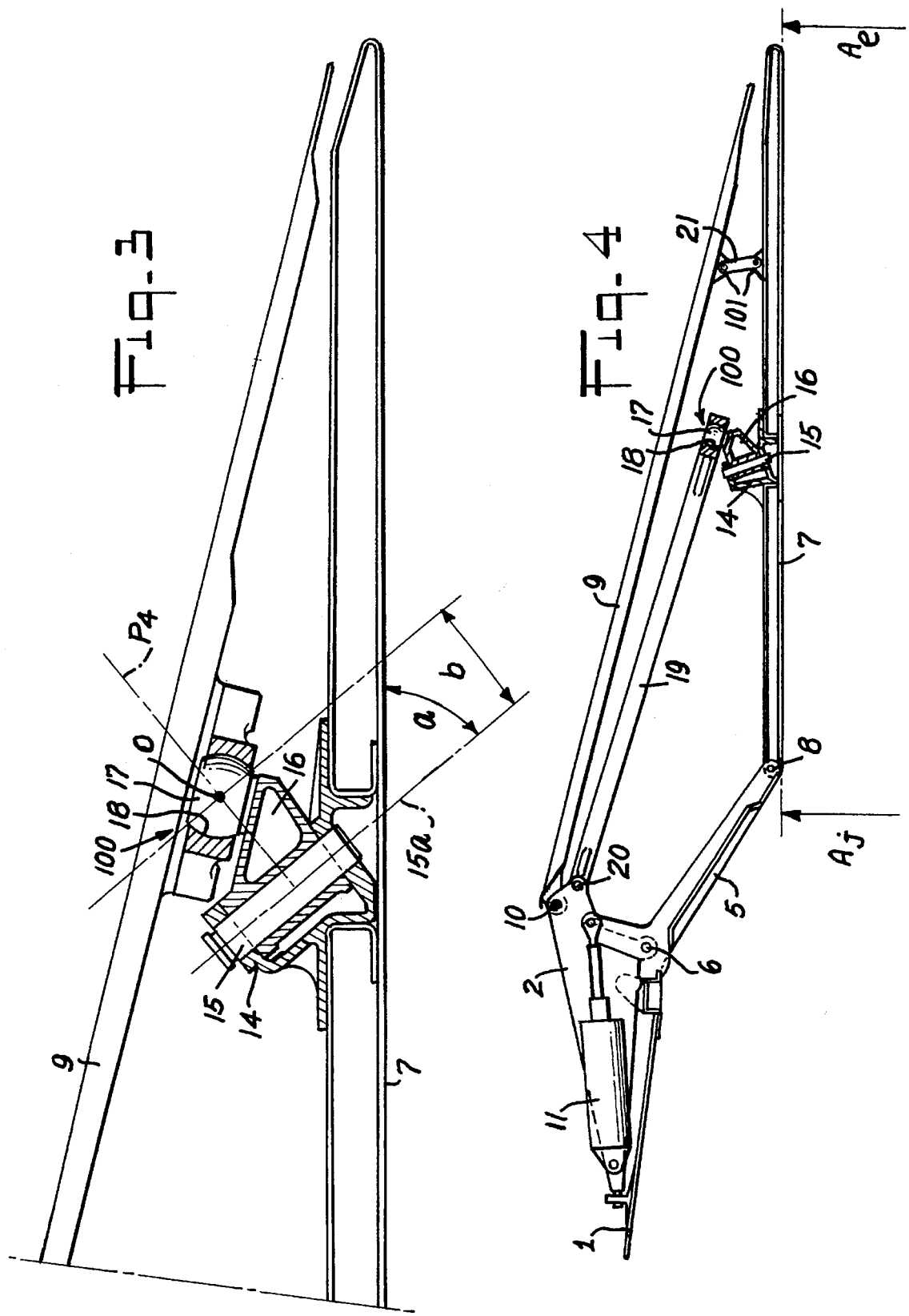

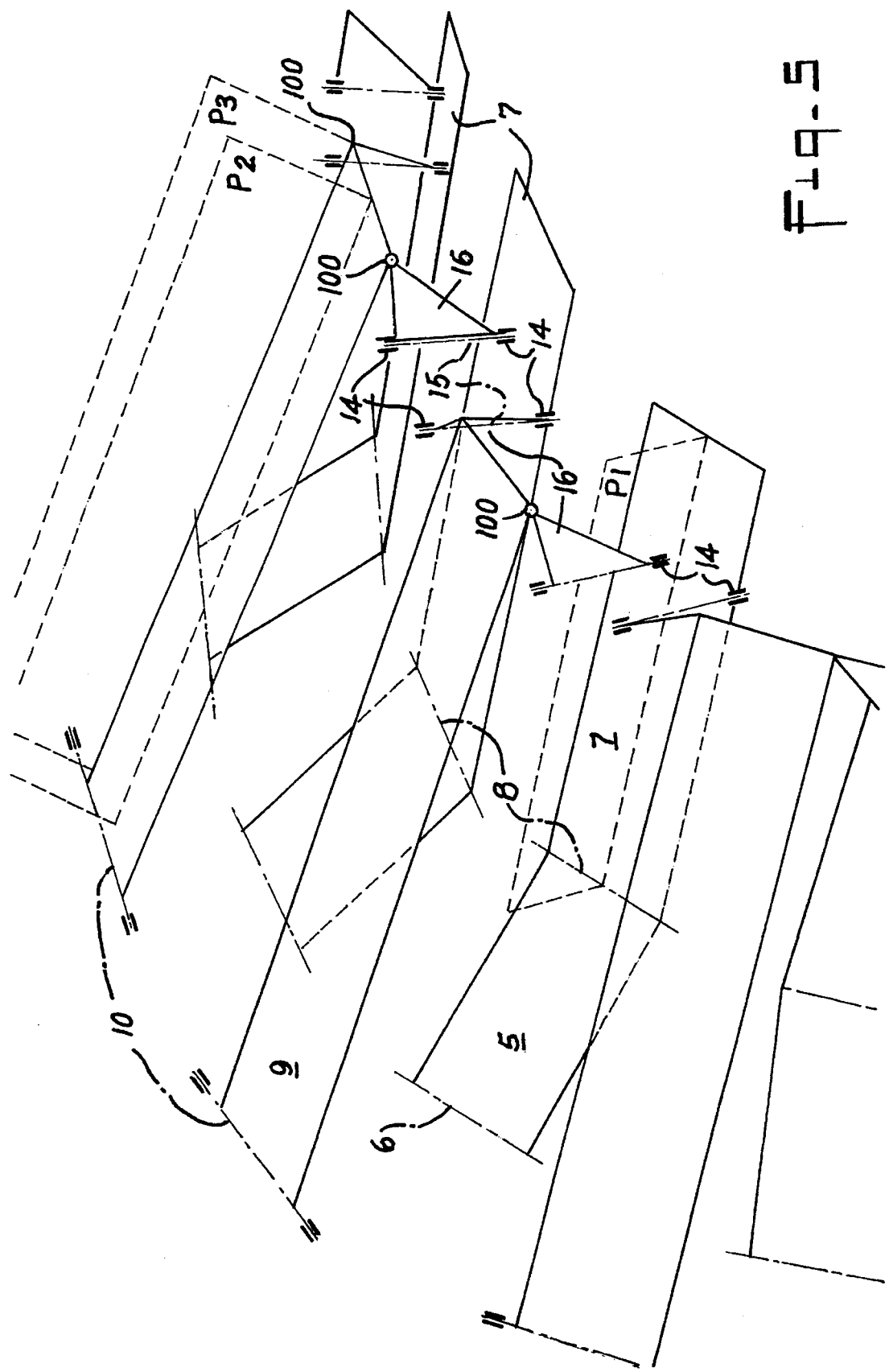

NOZZLE FOR A JET ENGINE CONTAINING AN ADJUSTABLE CONVERGENT-DIVERGENT PORTION

BACKGROUND OF THE INVENTION

The invention concerns a nozzle containing a convergent-divergent section in which the outlet section is a predetermined function of the throat section of a type comprising: an unjointed annular assembly of first flaps, each of which is articulated about an axis, called the first axis, of a rigid structure, this assembly constituting a convergent section; an unjointed annular assembly of second flaps, each of which is articulated about an axis, called the second axis, approximately parallel to the aforesaid first axis, of a corresponding first flap, this assembly constituting a divergent section; an articulated linkage coupling each second flap to the rigid structure in order to kinematically secure this second flap to the corresponding first flap so as to slave the outlet section, $A_e$, to the throat section, $A_j$, of the nozzle by the relationship $A_e = f(A_j)$; and drives associated with each first flap to cause this flap to pivot about the articulation coupling this latter to the fixed structure.

Known nozzles of this type generally are fitted with a special device to perform the function $A_e = f(A_j)$, or $A_e/A_j = f(A_j)$, and the kinematic link for synchronizing the flaps of the annular assemblies is provided by another device, independent of the first, resulting in a multiplication of the constituent members of the nozzle, an increase in its weight and price, and a reduction in its reliability.

SUMMARY OF THE INVENTION

The particular purpose of the present invention is to do away with these inconveniences and to propose a nozzle in which the same device slaves sections $A_e$ and $A_j$ in accordance with a predetermined function, $A_e = f(A_j)$, and is the kinematic linkage for synchronizing each of the two sets of nozzle flaps (convergent and divergent).

This goal is attained, according to the invention, because the aforesaid articulated linkage comprises a set of parts, called the synchronization part, each of which is connected at an interval between two adjacent second flaps and is, on the one hand, articulated at the rigid structure about an axis parallel to the aforesaid first and second axes and, on the other hand, is connected through the respective carrier to each of the two adjacent second flaps, each of the aforesaid carriers, called the first carriers, being connected, on the one hand to one of the following members: second flap and synchronization part, by a ball joint, and, on the other hand to other of these members by a pin joint, the axis of which is integral with the aforesaid other member, such that just one linkage provides the slaving of the outlet section $A_e$, to the throat section, $A_j$, and the kinematic linkage between all flaps of each annular set, thus permitting the mutual synchronization of the movements of all the flaps of each set.

Advantageously, the aforesaid other member is approximately flat. The axes of the aforesaid axial articulations are, though not necessarily, inclined with respect to the general plane of the aforesaid other member.

Advantageously, a first articulated carrier is generally triangular in shape, one side of which coincides, approximately, with the axis of the aforesaid pin joint, and the apex of which opposite the aforesaid side coincides, approximately, with the center of the ball joint.

Advantageously, a synchronization part comprises a third flap, which is located opposite the interval between two first and/or two adjacent flaps, and which is articulated at the rigid structure about an axis parallel to the first axis, and which is connected to each of the second flaps by the respective carrier. These carriers, called the second carriers, being connected to at least one of the following adjacent members: second and third flaps, by a ball joint.

Advantageously, the second carriers are made up of the aforesaid first carriers.

Advantageously, a synchronization part comprises two rods that are, on the one hand, articulated at the rigid structure about the same axis parallel to the aforesaid first axis, and on the other hand, each is connected to a respective second flap of adjacent second flaps by the respective carrier, each of the aforesaid carriers, called third carriers, being connected to at least one of the following adjacent members: rod and second flap, by a ball joint.

Advantageously, the aforesaid third carriers are made up of the aforesaid first carriers.

Advantageously, the aforesaid drives are made up of a set of drive parts, each independent of the other, each of the aforesaid parts being connected to a first flap.

Thus, the set of synchronization parts, together with the annular sets of first and second flaps, forms an annular chain of articulated links adjusted such that the aforesaid chain has only one degree of freedom.

BRIEF DESCRIPTION OF THE DRAWINGS

The other characteristics and advantages of the invention will be better understood by the reader of this description by referring to the attached drawings, wherein:

FIG. 1 is a partial sectional schematic through the longitudinal axial plane of a nozzle in accordance with a first embodiment of the invention;

FIG. 2 is a diagram of the $A_e/A_j$ ratio, that is, the ratio of the outlet section, $A_e$, to the throat section, $A_j$, of the nozzle, as a function of $A_j$;

FIG. 3 is an enlarged view of a detail of FIG. 1;

FIG. 4 is a partial sectional schematic through the longitudinal axial plane of a nozzle in accordance with a second embodiment of the invention; and FIG. 5 is a perspective schematic view shoing the arrangement of the nozzle flaps in accordance with FIG. 1.

DESCRIPTION OF THE PREFERRED EMBODIMENTS

The nozzle shown in FIGS. 1 and 3 comprises a channel 1, the downstream end of which contains supports 2, distributed uniformly about that downstream end, these supports 2 projecting toward the exterior from the exterior face of channel 1. Supports 2 are attached to channel 1 at 3 and 4.

A continuation of channel 1 on the downstream side is an adjustable convergent-divergent nozzle comprising: a first set of flaps 5, each articulated at 6 to member 2, and a second set of flaps 7, each articulated at 8 to the downstream end of a corresponding flap 5. Each flap 7 is an approximately coaxial, or aligned, continuation of corresponding flap 5.

The nozzle comprises, in addition, a third set of flaps 9, each articulated at 10 to 2, at its upstream end. The number n of flaps 9, called the cold flaps, is equal to the number of flaps 5, called the convergents, or to the number of flaps 7, called the divergents, and each cold flap 9 is displaced, through an angle about the periphery of channel 1, equal to 360°/2n (that is, by half a step) with respect to a convergent flap 5 or a divergent flap 7, respectively.

The tightness between two adjacent flaps 5 or 7 is ensured by a well-known arrangement; for example, by follower—or intermediate, or slaved—flaps, which are not shown. For a more detailed description of these follower flaps, see, for example, French Patent No. 2,180,440.

A hydraulic jack 11, or any other suitable mechanism, is connected to each convergent flap 5 of the first set of flaps. This jack is, on the one hand articulated at 12 to rigid structure 2 by its housing 11a, and on the other hand is articulated to the corresponding convergent flap 5 by the free end of its piston rod 11b, conforming to an axis of articulation 13, displaced outwardly in a direction opposite the axis of channel 1 with respect to articulation 6. In the example shown pin 13 is carried by the free end of an art 5a extending toward the exterior from the upstream end of flap 5.

As will also be seen from FIG. 5, each divergent flap 7 has two yokes near its downstream end arranged symmetrically with respect to each other and with respect to the bisector plane $P_1$ of its divergent flap 7. This plane $P_1$ is perpendicular to flap 7 and passes through the axis of channel 1 to divide that divergent flap 7 into two equal parts. Each yoke 14 is arranged to receive a hinge pin 15 which is inclined with respect to the plane of flap 7 by some angle "a" (see also FIG. 3). It is understood that the two pins 15 of the same flap 7 are symmetrical with respect to each other and with respect to plane $P_1$. Each yoke 14 receives a carrier 16, triangular in shape, for example, and is articulated to flap 7 by yoke 14 about pin 15, and which has at one end, or at the apex and opposite pin 15, a protruding spherical part 17 lodged in a spherical recess or cavity 18, machined in adjacent cold flap 9 such as to constitute a ball joint 100 between members 16 and 9. Thus, each cold flap 9 is an articulated mechanical link (linkage by carriers) between two adjacent divergent flaps 7. And, each divergent flap 7 at the same time is a hinged link between two adjacent cold flaps 9. The spherical recesses 18, in each of the cold flaps 9, are symmetrical with respect to each other and with respect to a bisector plane $P_2$ of the aforesaid cold flap 9. Plane $P_2$ is perpendicular to the plane of the flap 9. It passes through the axis of channel 1 and divides cold flap 9 into two equal parts (see the scheme in FIG. 5). The set formed by cold flaps 9, carriers 16, and divergent flaps 7 thus comprises a closed annular chain with its center in the axis of channel 1, so the mean diameter, as well as the angle of taper of its interior wall 7 or that of its exterior wall 9, are variable as a function of the aforesaid mean diameter.

FIG. 2 is a graph of section law $A_e/A_j = f(A_j)$. Points A, B, and C, plotted on curve F in FIG. 2, correspond to positions A, B, and C on FIG. 1 of hinged set 5, 7, 9, respectively.

Operation of the nozzle device is as follows:

When the nozzle is operated, each cold flap 9 turns about a fixed axis 10. Each center O, of the spherical seat 18, describes an arc of a circle contained in a plane $P_3$, parallel to plane $P_2$ (see FIG. 5). In the same way, each convergent flap 5 turns about fixed axis 6, carrying with it divergent flap 7 because of articulation 8.

There is a spatial position, determined by pins 15, for each configuration of the nozzle, that is, for each couple of values $A_j$ and $A_e/A_j$.

Each center O of the spherical end 17 of carriers 16 can only describe the arc of that circle centered on axis 15a and contained within plane $P_4$ (FIG. 3). This arc intersects plane $P_3$ at but one point because planes $P_4$ and $P_3$ do not coincide, nor are they parallel to each other.

Centers O of each spherical end 17 of carriers 16, and of their spherical seats 18, are coincident, so there is only one position of adjacent flaps 5 and 7, and this position corresponds to an angular position determined by cold flap 9 about axis 10. It is understood that the angles formed by each plane $P_1$ and adjacent plane $P_2$ are equal.

There is a well-determined position, symmetrical with respect to plane $P_2$, of two carriers 16 linked with the aforesaid flap 9 by ball hinges 100 for each position of cold flap 9.

In the same way, the two flaps 7, linked on both sides to this cold flap 9 by a first carrier 16, are positioned symmetrically with respect to plane $P_2$.

The second carrier 16, on each of these flaps 7, ensures the linkage with the adjacent cold flap 9 and imposes a symmetrical position of flap 9 with respect to its adjacent homolog with respect to the bisector plane $P_1$ of flap 7.

Thus, carriers 16 on each flap 7 impose a symmetrical position of flaps 9 with respect to plane $P_1$. Reciprocally, carriers 16 on each flap 9 impose a symmetrical position of flaps 7 with respect to plane $P_2$. By extension, the set of carriers 16 impose on the set of flaps 5, 7, 9 symmetrical positions with respect to the axis of the nozzle such that the result has the effect of "synchronizing" the set of nozzle flaps in all its configurations.

The relative displacements of the sets of flaps 5 and 7 with respect to sets of cold flaps 9 are a function of:

angle "a";

the distance "b" between center O and the geometric axis 15a of the articulation of carriers 16 on flaps 7 (FIG. 3);

the position of pin 15, or of axis 15a, with respect to articulations 8; and the position of the spherical seats 18 with respect to articulations 10.

Judicious choice of each of these parameters yields the unknown section law, $A_e/A_j = f(A_j)$.

It is possible that the type of section law $A_e/A_j$, will not be compatible with the lengths and/or the angles of the flaps imposed by other considerations (aerodynamic, or thermodynamic, for example).

In such case, the variant shown in FIG. 4 can be used. In accordance with the variant, each spherical recess 18 is made at the downstream end of a rod 19, articulated at its other end at 20 to support member 2. Each cold flap 9 is linked to each of the adjacent divergent flaps 7 by a carrier 21. The carriers 21 are articulated by means of spherical or swivel articulations 101 to members 7 and 9 to which they are linked.

The members in FIG. 4 that are identical, or analogous, to those in FIGS. 1, 3 and 5 carry the same references. It will be seen that in the case of the embodiment shown in FIG. 4, the symmetrical design of the different members has been respected so the "synchronization" effect is the same as that of the embodiment of FIGS. 1 and 3.

In accordance with yet another variant, not shown, but retaining a symmetrical design, it is possible to switch yoke 14 with ball seat 18 by reversing the direction of carrier 16. Section law $A_e/A_j$ then is different This possibility permits the realization of supplementary "families" of the law.

The nozzle being described comprises a convergent-divergent in which the outlet section $A_e$ is a predetermined functions $f(A_j)$, of the throat section $A_j$. This nozzle is of a type containing: an unjointed annular set of first flaps 5, each of which is articulated about an axis, called the first axis 6 to a rigid structure 2. This set together with associated follower flaps of a known type comprising the convergent; an unjointed annular set of second flaps 7, each of which is articulated about an axis, called the second axis 8, approximately parallel to the aforesaid first axis 6 of the corresponding first flap 5, this second set of flaps, together with the associated follower flaps of a known type, comprising the divergent; an articulated linkage connecting each second flap 7, to the rigid structure 2 so as to kinematically link this second flap to the corresponding first flap 5, to slave the outlet section $A_e$ to the throat section $A_j$, in accordance with the relationship $A_e=f(A_j)$; and drives connected to each first flap 5 to cause the flap to pivot about its articulation 6 connecting this latter to the rigid structure 2. The articulated linkage comprises a set of parts, called synchronization parts 9 or 19, each of which is connected to two adjacent second flaps 7 and is, on the one hand, articulated to the rigid structure 2 about an axis (10 or 20) parallel to the aforesaid first and second axes 6 and 8 and, on the other hand, connected to each of the two adjacent second flaps 7 by the respective carrier 16, each of these carriers 16, called first carriers, being connected on the one hand to one of the following members: second flap 7 and synchronization part by a ball joint 100 and, on the other hand, to the other of these members by a pin joint 14, 15, the pin 15 of which is integral with the aforesaid other members, such that just one linkage (9, 10, 14 to 16, 100) or (19, 20, 14 to 16, 100) provides the slaving of the outlet section $A_e$ to the throat section $A_j$ and the kinematic linkage between all flaps 5, 7 of each annular set of flaps, thus permitting the mutual synchronization of the movements of all the flaps of each set.

The nozzle in accordance with the invention has particular application to jet engines.

We claim:

1. In a turbojet engine having an outlet duct for exhaust gases, a first plurality of convergent nozzle flaps pivotally attached to the outlet duct, a second plurality of divergent nozzle flaps pivotally attached to a downstream edge of the plurality of convergent flaps, and actuating means connected between the outlet duct and the convergent flaps to cause the convergent flaps to pivot about their attachments to the outlet duct, the improvements comprising: a), link means having a first end pivotally attached to the outlet duct radially outwardly of the convergent flaps; b), at least one carrier element pivotally attached to each of the divergent flaps so as to pivot about a single axis oriented such that it passes through a plane defined by the divergent flap to which it is attached at an oblique angle thereto; and c), spherical ball-joint means interconnecting the carrier elements with the link means such that the convergent and divergent flaps define a nozzle in which the movement of the flaps are synchronized such that the outlet section ($A_e$) is a predetermined function of the throat section ($A_j$).

2. The improved turbojet engine of claim 1 wherein the link means comprises a third plurality of cold flaps disposed radially outwardly of the convergent and divergent.

3. The improved turbojet engine of claim 2 wherein each divergent flap has first and second carrier elements symmetrically attached thereto and further comprising means to attach the plurality of cold flaps to the outlet duct such that they are circumferentially offset with respect to the divergent flaps to enable each cold flap to be connected to one ball joint means of adjacent divergent flaps in order to synchronize the movements of the plurality of flaps.

4. The improved turbojet engine of claim 3 wherein the carrier element is generally triangular in shape with the pivot axis extending along one of the sides of the triangle.

5. The improved turbojet engine of claim 4 wherein the spherical ball joint means is connected to the carrier at the corner opposite the side having the pivot axis.

6. The improved turbojet engine of claim 1 wherein the link means comprises a plurality of rods each having a first end pivotally attached to the outlet duct.

7. The improved turbojet engine of claim 6 further comprising: a third plurality of cold flaps disposed radially outwardly of the convergent and divergent flaps and having an upstream edge pivotally attached to the outlet duct; and a plurality of carrier rods interconnecting each cold flap to a pair of adjacent divergent flaps.

8. The improved turbojet engine of claim 7 wherein the carrier element is generally triangular in shape with the pivot axis extending along one of the sides of the triangle.

9. The improved turbojet engine of claim 8 wherein the spherical ball joint means is connected to the carrier at the corner opposite the side having the pivot axis.

* * * * *